(12) United States Patent
Abernathy

(10) Patent No.: US 8,649,917 B1
(45) Date of Patent: Feb. 11, 2014

(54) APPARATUS FOR MEASUREMENT OF VERTICAL OBSTRUCTIONS

(71) Applicant: Michael Franklin Abernathy, Albuquerque, NM (US)

(72) Inventor: Michael Franklin Abernathy, Albuquerque, NM (US)

( * ) Notice: Subject to any disclaimer, the term of this patent is extended or adjusted under 35 U.S.C. 154(b) by 0 days.

(21) Appl. No.: 13/627,376

(22) Filed: Sep. 26, 2012

(51) Int. Cl.
 *G01S 13/00* (2006.01)
 *G06F 17/30* (2006.01)

(52) U.S. Cl.
 USPC ......... 701/2; 701/3; 701/25; 244/23; 348/140

(58) Field of Classification Search
 USPC ......... 701/2, 3, 25, 24, 528; 707/754; 244/23, 244/190; 348/140, 144
 See application file for complete search history.

(56) References Cited

U.S. PATENT DOCUMENTS

| | | | |
|---|---|---|---|
| 7,071,970 B2 | 7/2006 | Benton | |
| 7,095,488 B2 | 8/2006 | Jamieson et al. | |
| 7,126,534 B2 | 10/2006 | Smith et al. | |
| 7,555,383 B2 | 6/2009 | Siegel | |
| 7,693,617 B2 | 4/2010 | Dockter et al. | |
| 7,838,322 B1 | 11/2010 | Vargo et al. | |
| 2004/0183695 A1* | 9/2004 | Ruokangas et al. | 340/945 |
| 2008/0243383 A1 | 10/2008 | Lin | |
| 2010/0005102 A1* | 1/2010 | Stefani | 707/10 |
| 2011/0130913 A1* | 6/2011 | Duggan et al. | 701/23 |

* cited by examiner

*Primary Examiner* — Tan Q Nguyen

(74) *Attorney, Agent, or Firm* — Richard H. Krukar; Kermit D. Lopez; Luis M. Ortiz

(57) ABSTRACT

Accurate measurements of flight path obstructions are taken from a moving aerial platform. Platform position, including altitude, is combined with dynamic data including target distance and target elevation data to calculate obstruction height or altitude. An optical subsystem on the aerial platform images the obstructions and provides a video stream showing the obstructions. The video stream and aerial platform data are wirelessly communicated to a control terminal where an operator observes a presentation of obstructions and obstruction altitudes or heights. The operator can issue commands to the aerial platform.

16 Claims, 3 Drawing Sheets

APPARATUS FOR MEASUREMENT OF VERTICAL OBSTRUCTIONS

CROSS-REFERENCE TO RELATED APPLICATIONS

This patent application is a continuation of U.S. patent application Ser. No. 12/256,284, entitled "Apparatus for Measurement of Vertical Obstructions" filed on Oct. 22, 2008, which is herein incorporated by reference in their entirety.

TECHNICAL FIELD

Embodiments relate to the fields of aviation, mapping, and geospatial data. In particular, embodiments relate to the creation and verification of data relating to flight path obstructions.

BACKGROUND

One obvious requirement for aircraft safety is to avoid flying into things. There are many possible flight path obstructions most of them having a specific and constant geographic coordinate and height. Obstruction coordinate and height data are contained in databases such as the various geographic information system (GIS) databases used in flight planning and in producing navigation maps for pilots. New obstructions are constantly being produced during and after construction activities and the quicker the new obstructions are added to the databases, the safer air travel is. Furthermore, obstruction location and height should be occasionally verified to correct faulty GIS data.

Object height has been measured in a number of different ways, for example, aerial photograph stereography. In aerial photograph stereography, two pictures are taken. After matching the features between the two pictures, stereographic equations are solved in an attempt to locate the features in a three dimensional space. To measure obstructions, one feature is the obstruction's top and another is the ground at the obstruction's base. The resolution suffers because aerial photographs are taken in a direction which is orthogonal to the measurement of interest. To wit, the camera is looking in the approximately vertical axis, yet seeks to measure vertical size. This means that small errors in the apparent position of vertical objects are magnified geometrically. Also, fine structures such as antennae atop towers or buildings are difficult to detect, yet an aircraft striking one of these small antennae could be damaged or destroyed.

Down-looking LiDAR systems have been used to construct topographic digital terrain maps. This at least makes a direct measure in the vertical, and indeed these systems provide excellent maps of larger topographic hazards to aviation including terrain and buildings. However, the detection of smaller features is a problem. LiDAR systems may be capable of measuring objects as small as a meter across, but cannot hope to measure an antenna of ½ inch diameter. As such, certain common aviation hazards are overlooked.

Perspective photographic measurement techniques use a picture or multiple pictures taken with a camera instrumented to measure line of sight angles. This method has the advantage of looking at the measurement of interest—the obstruction from the side. However, in practice it is not practical to image a building with enough pixel resolution to capture from the base of the building and be able to clearly measure the lightening rod on its top.

The existing methods do not provide a consistent and accurate measurement of the fine structure of obstructions. The fine structures, such as a ½ inch antenna, are quite capable of damaging aircraft. Systems and methods for rapidly, inexpensively, and accurately measuring obstruction heights are needed.

BRIEF SUMMARY

Aspects of the embodiments address limitations and flaws in the prior art by observing the fine structure of obstructions without the need to image the entire obstruction.

It is therefore an aspect of the embodiments that an instrumented aircraft locates and measures obstructions. The aircraft, perhaps an unmanned aerial vehicle (UAV), has a distance measuring module, an altitude measuring module, and an angle measuring module.

The distance measuring module measures the distance, the platform distance, from the airborne platform to a target such as a flight path obstruction. The altitude measuring module measures the airborne platform's height or altitude. The angle measuring module measures an elevation angle indicating an angle between horizontal and a line from the aerial platform to the target.

It is another aspect of the embodiments that an analysis module accepts the platform distance, the platform altitude, and the elevation angle as input and produces an estimate of the target's height as output.

It is a further aspect of the embodiments that a user, perhaps the UAV's remote operator, observes the target height on a presentation module. The presentation module typically includes a video monitor displaying a video stream captured by a camera in the UAV. The target height can be overlayed onto the displayed video such that the user simultaneously sees the target and an indication of the target's height.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DETAILED DESCRIPTION OF THE INVENTION

The particular values and configurations discussed in these non-limiting examples can be varied and are cited merely to illustrate embodiments and are not intended to limit the scope of the invention.

Accurate measurements of flight path obstructions are taken from a moving aerial platform. Platform position, including altitude, is combined with dynamic data including target distance and target elevation data to calculate obstruction height or altitude. An optical subsystem on the aerial platform images the obstructions and provides a video stream showing the obstructions. The video stream and aerial platform data are wirelessly communicated to a control terminal where an operator observes a presentation of obstructions and obstruction altitudes or heights. The operator can issue commands to the aerial platform.

Figure 1:
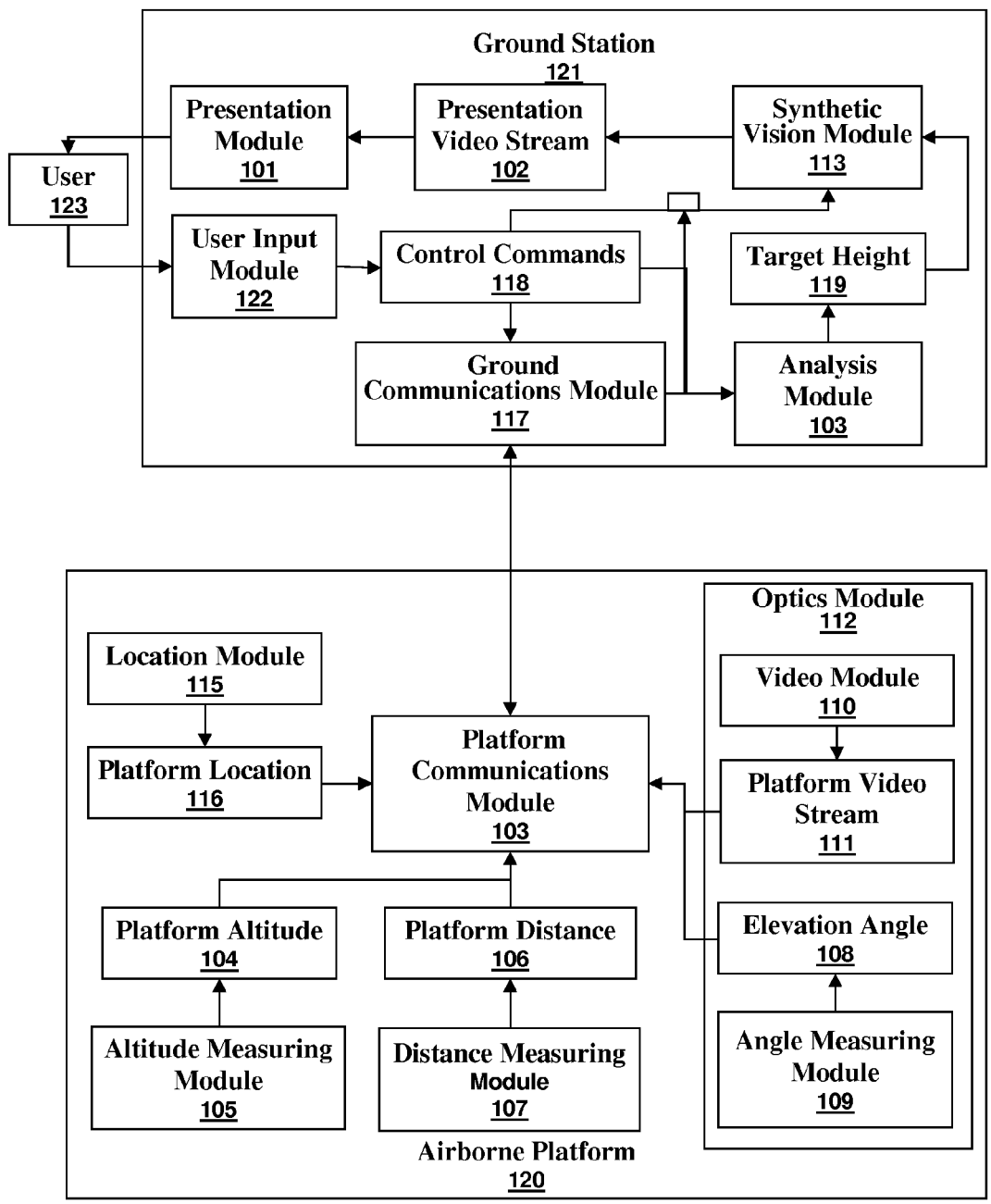
FIG. 1 illustrates a ground station in communication with an airborne platform in accordance with aspects of the embodiments.

FIG. 1 illustrates a ground station 121 in communication with an airborne platform 120 in accordance with aspects of the embodiments. A user 123 supplies control commands 118 into a user input module 122. Some of the control commands 118 command or control the ground station 121 while others control the airborne platform 120. Ground station control commands can control the presentation of video and data by the presentation module 101. Airborne platform control commands pass through a ground communications module 117 to a platform communications module 103 within the airborne platform 120. Airborne platform control commands can control heading, camera aim point, enable or disable onboard systems, or other actions.

The airborne platform has a location module 115 that outputs the platform location 116. For example, a Global Navigation Satellite System (GNSS) system such as the U.S. Global Positioning System (GPS) can be used to discern the airborne platform's geographic coordinates. A GPS receiver can output the airborne platform location 116. A GNSS or GPS receiver can also act as an altitude measuring module 105 by determining and outputting the platform altitude 104. Other instruments, such as a radar altimeter, laser altimeter, or barometric altimeter can act as the altitude measuring module 105.

An optics module 112 has optical, electro-optical, and mechanical-optic subsystems for obtaining imaging and measuring elevation angle 108. A video module 110, such as a video camera, can produce a video stream 111 that can be transmitted back to the ground station 121 and passed to a synthetic vision module 113. The synthetic vision module 113 can combine the platform video stream 111 with other imagery or data overlays to produce a presentation video stream 102 that is then displayed by the presentation module 101 to the user 123.

The optics module 112 also contains an angle measuring module 109 that produces an elevation angle 108. The optics module can contain, but need not contain, the distance measuring module 107 that measures the platform distance 106. The platform distance 106 is the distance from the airborne platform 120 to a target. The angle measuring module 109 can be a laser range finder (LRF), RADAR range finder, optical parallax range finder, or optical focus range finder. Many of these instruments are optical and properly belong within the optics module 112. A different way of measuring platform distance is through geographic coordinates. The target coordinates are often precisely known and contained within a database. The Euclidean distance between the platform location 116 and the known target coordinates can be used as a platform distance 106.

The platform location 116, platform altitude 104, platform distance 106 (or its analogs), and elevation angle 108 can be passed to an analysis module 103 to produce a target height 119 that is then passed to the synthetic vision module 113 for eventual display to the user 123. The analysis module 103 is illustrated as part of the ground station 121 whereas many embodiments can contain it within the airborne platform 120 as well. The calculation of target height from the measured data is a matter of applying high school level trigonometry.

Figure 2:
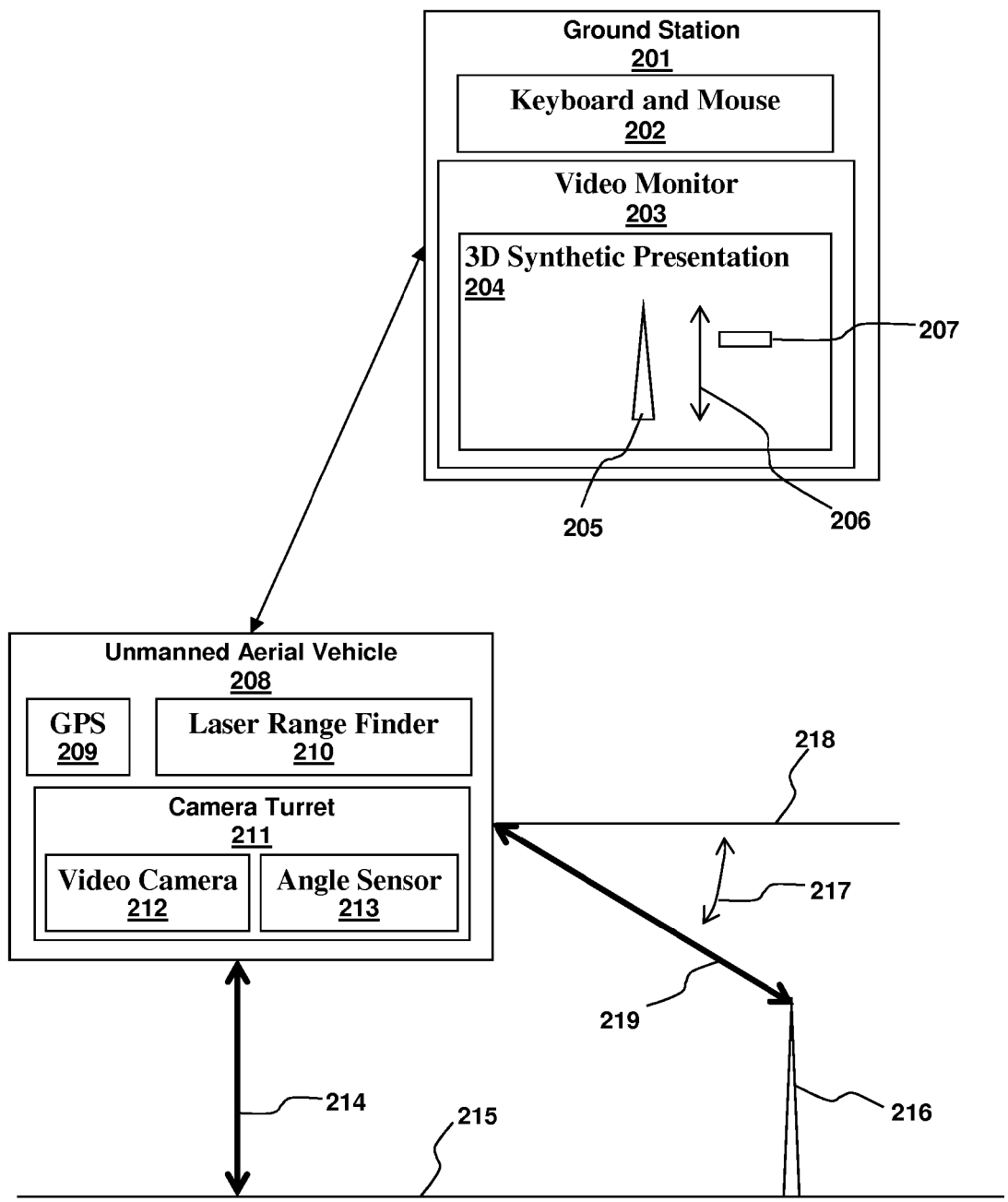
FIG. 2 illustrates a system obtaining target height data in accordance with aspects of the embodiments.

FIG. 2 illustrates a system obtaining target height data in accordance with aspects of the embodiments. A UAV 208 uses a GPS receiver to determine platform location and altitude 214 above sea level. A laser altimeter, on the other hand, would find the altitude above the ground 215. A laser range finder 210 measures the platform distance 219 to a target 216. A camera turret 211 contains a video camera 212 and an angle sensor 213. The camera turret 211 aims the video camera 212, and preferentially the laser range finder 210, at the target 216. The video camera 212 images the target 216 and an angle sensor 213 measures the elevation angle 217. The elevation angle is the angle between a horizontal reference 218 and a line from the UAV 208 and the target 216. The camera turret 211 can be steered and controlled by a user issuing commands to a ground station's keyboard and mouse 202. The user can observe a presentation video stream on a video monitor 203 displaying a 3D synthetic presentation 204. The 3D synthetic presentation 204 can show the camera video including a target image 205 as well as added features. The added features can include a target height annotation 207 and a height scale reticule 206.

Figure 3:
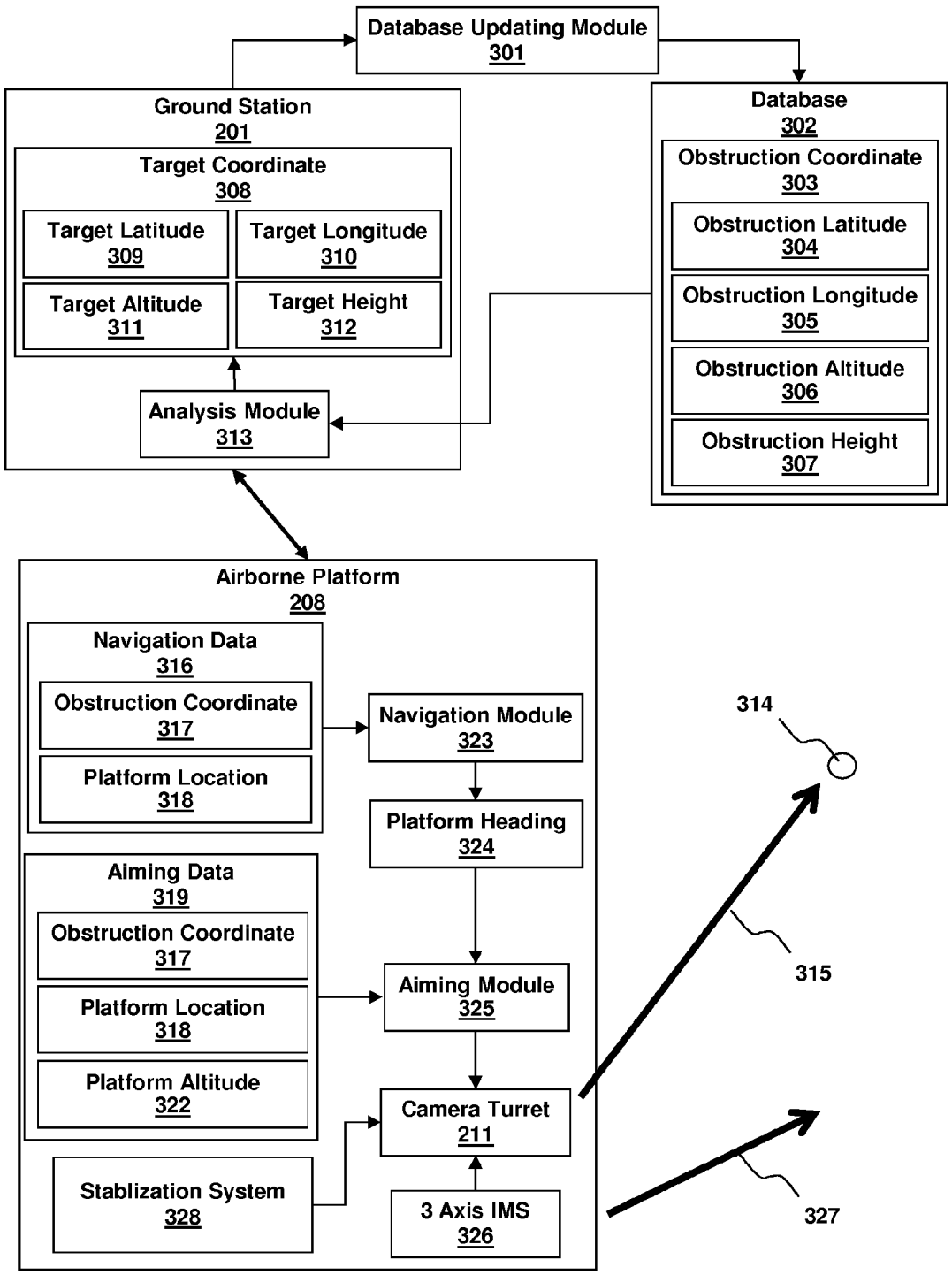
FIG. 3 illustrates a target height measurement system communicating with a database in accordance with aspects of the embodiments.

FIG. 3 illustrates a target height measurement system communicating with a database 302 in accordance with aspects of the embodiments. The database 302 contains obstruction coordinates 303. Each obstruction coordinate can include obstruction latitude 304, obstruction longitude 305, obstruction altitude 306, and obstruction height 307. Here, obstruction altitude is distance above sea level while obstruction height is distance above the ground.

Obstruction data can be used to guide the airborne platform toward the obstruction. Navigation data 316 including the platform location (current position) and the obstruction coordinate (desired position) can be passed to a navigation module 323 that then calculates a platform heading 324. The airborne platform 208 can then fly the platform heading 324 to the target 314. Aiming data 319 is similar to navigation data 316 with the exception that platform altitude 322 is helpful. It is also helpful if the obstruction coordinate 317 includes obstruction height 307 or obstruction altitude 306. The aiming data 319 and the platform heading 324 are passed to an aiming module 325 that then determines an aiming vector 315 for the camera turret 211.

After finding the target 314, an operator can refine the aiming vector to point at the top of the target 314. The platform location 318, platform altitude 322, platform distance, and elevation angle can then be passed to an analysis module 313 that determines a target coordinate 308 that can include target latitude 309, target longitude 310, target altitude 311, and target height 312. A database updating module 301 can then update the database 302 when the target coordinate 308 is a more accurate measurement of the obstruction coordinates 303 than that currently contained in the database 302.

Aircraft and other moving platforms are less stable than camera tripods and, as such, a camera stabilization system 328 can greatly smooth out the acquired video stream and measurements. Furthermore, an aircraft is very rarely always flying straight and level while also pointing exactly where it is going. An aircraft has a platform vector 327 that is indicative of the aircrafts attitude (pitch, yaw, and roll). A 3 axis inertial measurement systems (IMS) 326 are often used to measure platform vectors 327. As such, the IMS can supply a horizontal reference against which the elevation angle can be determined. Alternatively, the elevation angle can be easily calculated from the aiming vector and the platform vector.

In certain embodiments, the optical subsystem is capable of variable magnification (zoom) so that the operator can zoom in to examine fine structures on the obstruction such as antenna, lightening rods, flagpoles, cables, and guy wires. A high resolution database can contain entries for each of the fine structures on an obstruction. For example, a tall building can have entries for the building itself, its lightening rod, and an antenna attached away from the lightening rod.

Another embodiment of the invention examines the full obstruction. It can work as follows. A mobile platform such as a UAV, aircraft, or ground vehicle contains the requisite modules, such as GPS and optics modules, for measuring its own location as well as the relative location of an aim point. The operator inputs a location on the surface of the earth at which the optical system is pointed. The operator then adjusts the system until it points at the base of an obstruction. The operator then commands the computer to measure the distance to the obstruction base from the optical system and the elevation angle to the base. From this information a computer computes the location of the obstruction base in three dimensions (e.g. latitude, longitude, and altitude or other geometric coordinate system).

Next, the operator scans the optical system up the obstruction to find the highest point. The optical system must provide adequate magnification to permit the operator to see fine structure objects including cable, antennae, and guy wires. The operator points the camera at the top of the obstruction and again commands the computer to measure the distance and the elevation angle. The computer uses this information to compute the height of the obstruction. Note that the mobile platform can take the bottom measurement from one platform location and the top measurement from a different platform location.

Details of Certain Embodiments:

1. It is difficult to get an adequate LRF return signal from a small antenna. In such a case, if the antenna is directly above the obstruction base, the computer can be instructed to simply use the obstruction base horizontal position to compute the distance to the top of the obstruction.
2. It is desirable that the optical camera system have an infrared capability because of the presence of haze during typical operations.
3. High Definition video is preferable to standard definition video because of the need to detect fine objects.
4. A substantial optical magnification capability results in improved fuel savings in the inspection aircraft.
5. The software used to control the turret and record the data must be designed for rapid efficient operation, allowing the verification of the largest number of targets in the smallest amount of time.
6. A criterion is given for the required proximity to an obstruction for measurement purposes. It is a function of the smallest probable obstruction size (say ½ inch) and the smallest object that can be seen by the camera at a given range.
7. The limitations of accuracy are primarily driven by the accuracy of the measurements of the platform distance, elevation angle, platform location, and platform altitude.
8. While in theory the system need only measure the angle of the line of sight with respect to horizontal, in practice moving platforms are rarely aligned with the horizontal plane. So a three axis inertial measurement system is often used to find the 3 axis platform altitude and then mathematically combined with the pointing angles of the camera line of sight, and from that the simple absolute pitch angle or elevation angle is computed.
9. MPEG/KLV encoded data can be created from this system and will retain all information necessary to reconstruct the measurement and inspection of obstructions.
10. It is not technically necessary that the optical system contain an imaging focal plane (like a video camera) since only the optical centerline matters, however, in practice they are often used.

The embodiment and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those skilled in the art following the reading of this disclosure, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

What is claimed is:

1. A system comprising:
    a ground station comprising a user interface;
    an unmanned aerial vehicle (UAV) in communication with the ground station wherein the UAV comprises a distance measuring module, a location module, an angle measuring module, and an optics module;
    image data wherein the optics module captures the image data and wherein the UAV transmits the image data to the ground station for presentation to a user;
    control commands wherein the user manipulates the user interface to thereby cause the ground station to transmit the control commands to the UAV, wherein the control commands comprise imaging commands that control the optics module;
    an obstruction distance wherein the user commands the optics module to point at an obstruction, wherein the user observes the image data and selects a target on the obstruction, wherein the distance measuring module determines the distance between the UAV and the target, and wherein the obstruction is a hazard to aviation;
    an elevation angle wherein the angle measuring module determines the elevation angle between the UAV and the target;
    an analysis module that produces target data based on data from data sources wherein the target data comprises a target altitude, wherein the data sources comprise the location module, the angle measuring module, and the distance measuring module, and wherein the target altitude is the target altitude above sea level; and
    a database entry for submission to an aviation database as an aviation obstruction wherein the aviation database stores aviation flight planning data, and wherein the database entry comprises the target altitude and the target location.

2. The system of claim 1 wherein the target data further comprises a target latitude and a target longitude.

3. The system of claim 1 further comprising a database updating module that accepts the database entry and updates the aviation database to thereby store information about the obstruction.

4. The system of claim 1 wherein the optics module produces a video stream and wherein the user interface presents a three dimensional synthetic presentation to the user.

5. The system of claim 4 wherein the three dimensional synthetic presentation comprises a target annotation indicating the target altitude.

6. The system of claim 1 further comprising a navigation module wherein the navigation module uses an obstruction coordinate to guide the UAV toward the obstruction.

7. The system of claim 6 further comprising an aiming module that uses the obstruction coordinate to aim the optics module at the obstruction.

8. A system comprising:
- a ground station comprising a user interface;
- an unmanned vehicle in communication with the ground station wherein the unmanned vehicle comprises a distance measuring module, a location module, an angle measuring module, and an optics module;
- image data wherein the optics module captures the image data and wherein the unmanned vehicle transmits the image data to the ground station for presentation to a user;
- control commands wherein the user manipulates the user interface to thereby cause the ground station to transmit the control commands to the unmanned vehicle, and wherein the control commands comprise imaging commands that control the optics module;
- an obstruction distance wherein the user commands the optics module to point at an obstruction, wherein the user observes the image data and selects a target on the obstruction, wherein the distance measuring module determines the distance between the unmanned vehicle and the target;
- an analysis module that produces target data based on data from data sources wherein the target data comprises a target latitude and a target longitude, and wherein the data sources comprise the location module, the angle measuring module, and the distance measuring module; and
- a database entry for submission to a navigation database as an obstruction wherein the navigation database stores route planning data, and wherein the database entry comprises the target data.

9. The system of claim 8 further comprising the navigation database wherein the navigation database is updated with the database entry.

10. The system of claim 8 wherein the target data further comprises a target altitude wherein the obstruction is a hazard to aviation, and wherein the navigation database is an aviation database that stores aviation flight planning data.

11. The system of claim 10 further comprising the aviation database wherein the aviation database is updated with the database entry.

12. The system of claim 8 further comprising a database updating module that accepts the database entry and updates the navigation database to thereby store information about the obstruction.

13. The system of claim 8 wherein the optics module produces a video stream and wherein the user interface presents a three dimensional synthetic presentation to the user.

14. The system of claim 13 wherein the three dimensional synthetic presentation comprises a target annotation indicating at least one datum in the target data.

15. The system of claim 8 further comprising a navigation module wherein an obstruction coordinate obtained from the navigation database is used to guide the unmanned vehicle toward the obstruction.

16. The system of claim 8 further comprising an aiming module wherein an obstruction coordinate obtained from the navigation database is used to aim the optics module at the obstruction.

* * * * *